United States Patent
Schmutzer et al.

(10) Patent No.: US 11,792,042 B1
(45) Date of Patent: Oct. 17, 2023

(54) INTERWORKING BETWEEN DIFFERENT LAYER TWO MEDIAS USING NETWORK TUNNELS

(71) Applicant: Cisco Technology, Inc., San Jose, CA (US)

(72) Inventors: Christian Schmutzer, Koenigsbrunn Im Weinviertel (AT); Onkar R. Deshpande, Bangalore (IN); Patrick J. Cunningham, Pembroke, MA (US)

(73) Assignee: Cisco Technology, Inc., San Jose, CA (US)

( * ) Notice: Subject to any disclaimer, the term of this patent is extended or adjusted under 35 U.S.C. 154(b) by 23 days.

(21) Appl. No.: 17/302,303

(22) Filed: Apr. 29, 2021

(51) Int. Cl.
*H04L 12/46* (2006.01)
*H04L 45/50* (2022.01)
*H04L 45/00* (2022.01)

(52) U.S. Cl.
CPC .......... *H04L 12/4633* (2013.01); *H04L 45/50* (2013.01); *H04L 45/66* (2013.01); *H04L 2212/00* (2013.01)

(58) Field of Classification Search
CPC ..... H04L 12/4033; H04L 45/50; H04L 45/66; H04L 2212/00
See application file for complete search history.

(56) References Cited

U.S. PATENT DOCUMENTS

| | | | |
|---|---|---|---|
| 8,532,137 B1 | 9/2013 | Afferton et al. | |
| 2003/0070007 A1* | 4/2003 | Tchakmakjian | ........ H04L 61/00 719/330 |
| 2004/0170173 A1 | 9/2004 | Pan et al. | |
| 2007/0030851 A1 | 2/2007 | Sinicrope et al. | |
| 2011/0261812 A1 | 10/2011 | Kini et al. | |
| 2020/0153525 A1 | 5/2020 | Annavajjala et al. | |

FOREIGN PATENT DOCUMENTS

| CN | 101193000 A | * | 6/2008 |
| CN | 101193000 A | * | 9/2008 |
| CN | 101262301 A | * | 9/2008 |
| CN | 103997384 A | * | 8/2014 |

* cited by examiner

Primary Examiner — Jianye Wu
(74) Attorney, Agent, or Firm — Patterson + Sheridan, LLP

(57) ABSTRACT

Interworking between different layer two (L2) medias using network tunnels is provided by receiving, at a virtual gateway network element (GNE), a packet from a first L2 media type network for transmission to a second L2 media type network under the control of a different entities, wherein the first and second L2 media type networks are incompatible for direct packet transmission; removing, at the virtual GNE, ethernet encapsulation from the packet; re-encapsulating, at a network device located between the virtual GNE and a packet network, the packet in a multi-protocol label switching (MPLS) encapsulation; forwarding, over the packet network, the packet from the network device to a digital communication channel (DCC) associated with the second L2 media type network; replacing, at the DCC, the MPLS encapsulation with a link access protocol (LAP) encapsulation; and transmitting the packet encapsulated with the LAP encapsulation to the second L2 media type network.

20 Claims, 5 Drawing Sheets

US 11,792,042 B1

INTERWORKING BETWEEN DIFFERENT LAYER TWO MEDIAS USING NETWORK TUNNELS

TECHNICAL FIELD

Embodiments presented in this disclosure generally relate to networked communications. More specifically, embodiments disclosed herein provide for linking networks using different layer two (L2) medias via network tunnels (also referred to as pseudowires or PW).

BACKGROUND

As networking technology advances and new standards are developed, various network providers may adopt different technologies at different paces. Deployment of new infrastructure and standards (and replacement of legacy infrastructure) can be further complicated by different parties owning the various devices. Accordingly, these upgrades are time consuming, particularly for multisite networks or networks that span multiple provider facilities, and different parties can find themselves using different technologies and standards, which do not always offer backwards compatibly. Temporary solutions are often deployed to bridge the time period where one portion of the network is modernized and the other is in a legacy state, but as deployment is fluid, these solutions can require constant adjustment; adding to the challenges associated with upgrading the infrastructure and standards used across a networking environment.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
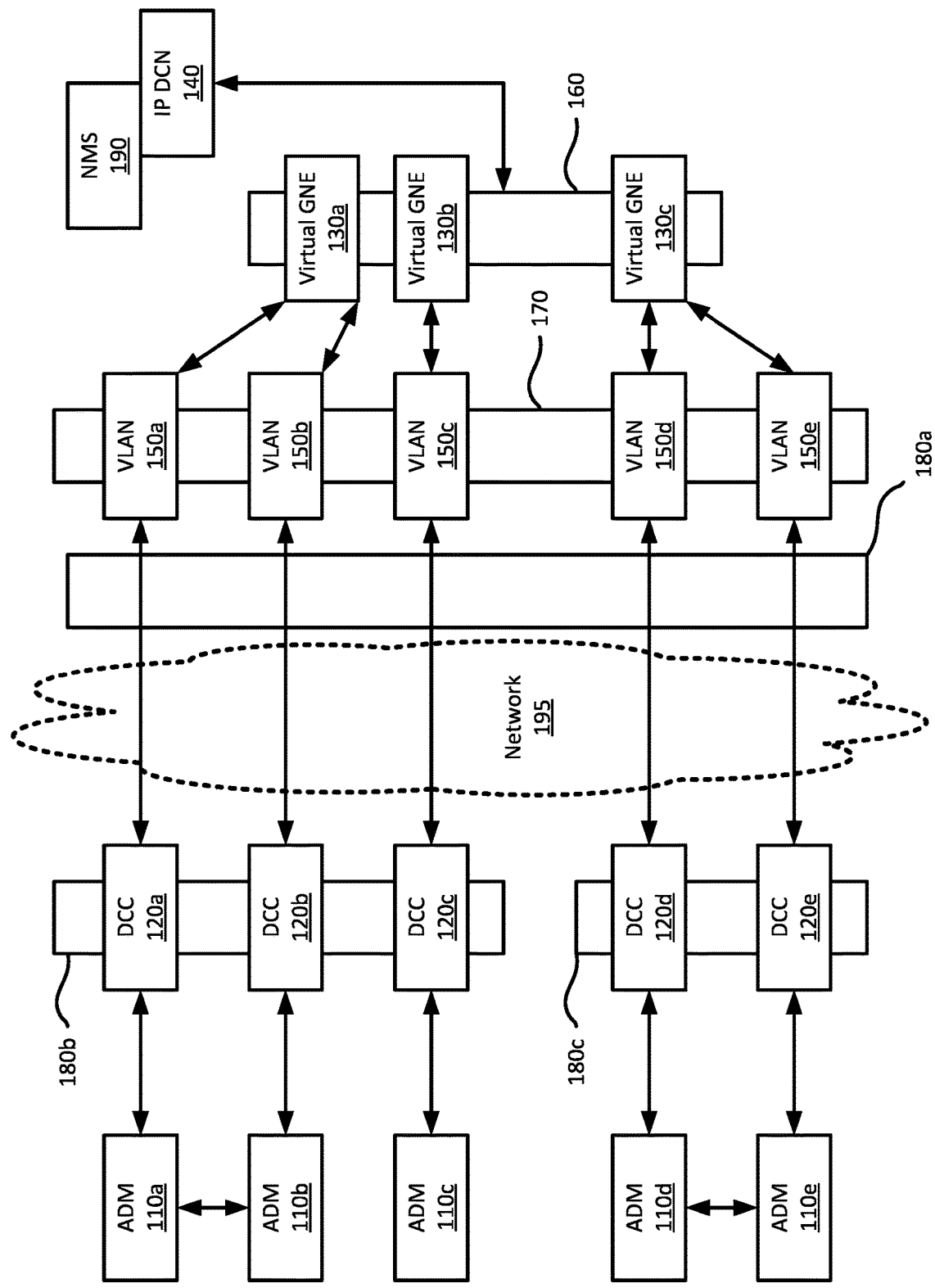
FIG. 1 illustrates a network environment, according to embodiments of the present disclosure.

One embodiment presented in this disclosure is a method comprising: receiving, at a virtual gateway network element (GNE) under control of a first entity, a packet from a first L2 (level two) media type network for transmission to a second L2 media type network under the control of a second entity, wherein the first L2 media type network and the second L2 media type network are incompatible for direct packet transmission; removing, at the virtual GNE, Ethernet encapsulation from the packet; re-encapsulating, at a network device located between the virtual GNE and a packet network, the packet in a multi-protocol label switching (MPLS) encapsulation; forwarding, over the packet network, the packet from the network device to a digital communication channel (DCC) associated with the second L2 media type network; replacing, at the DCC, the MPLS encapsulation with a Link Access Protocol (LAP) encapsulation; and transmitting the packet encapsulated with the LAP encapsulation to the second L2 media type network.

One embodiment presented in this disclosure is a method comprising: receiving, at a digital communication channel (DCC) under control of a first entity, a packet from a first L2 (level two) media type network under the control of a second entity destined for a recipient in a second L2 media type network, wherein the first L2 media type network and the second L2 media type network are incompatible for direct packet transmission; removing, at the DCC, a Link Access Protocol (LAP) encapsulation from the packet; re-encapsulating, at the DCC, the packet in a multi-protocol label switching (MPLS) encapsulation; forwarding the packet from the DCC to a network device between a virtual Gateway Network Element (GNE) associated with the first L2 media type network and a packet network; replacing the MPLS encapsulation with an Ethernet encapsulation; and transmitting, from the virtual GNE, the packet encapsulated with the Ethernet encapsulation to the recipient identified in the packet in the second L2 media type network.

One embodiment presented in this disclosure is a system comprising: a virtual Gateway Network Element (GNE) connected to a first L2 media type network via an Ethernet connection and to a first network device; a digital communication channel (DCC) hosted on a second router connected over an internet protocol (IP) network to the first network device, and associated with a second L2 media type network controlled by a second party wherein the first L2 media type network and the second L2 media type network are incompatible for direct packet transmission; wherein the virtual GNE and the first router are configured to: receive downlink packets from the first party for transmission to the second party; remove Ethernet encapsulation from the downlink packets; re-encapsulate the downlink packets in a multi-protocol label switching (MPLS) encapsulation; forward the downlink packet with the MPLS encapsulation to the DCC; receive uplink packets with the MPLS encapsulation from the DCC, received by the DCC from the second party for transmission to the first party; replace the MPLS encapsulation in the uplink packets with the Ethernet encapsulation; and transmit the uplink packets encapsulated with the Ethernet encapsulation to the first party.

Example Embodiments

The present disclosure provides for the management of a hybrid network using legacy equipment in a first set of facilities (e.g., client facilities) and updated equipment at a second set of facilities (e.g., provider facilities). To enable the hybrid network to operate with lower overhead and without disruption of the first set of facilities, network tunnels are deployed in a central office between the two sets of facilities (or in a provider facility) to emulate the legacy wiring and transmission arrangement within the controlled environment. Connectionless-mode Network Protocol (CLNP) packets are tunneled through the upgraded network over the network tunnels without using any data link layer (DLL) information to allow for easier/faster translation between the legacy and updated current transmission schema (e.g., Ethernet/VLAN versus LAPD (Link Access Protocol D-Channel)).

FIG. 1 illustrates a network environment, according to embodiments of the present disclosure. Several Add/Drop Multiplexers (ADM) 110a-e (generally or collectively, ADM 110) are shown in communication via a corresponding Digital Communication Channel (DCC) 120a-e (generally or collectively, DCC 120). The ADMs 110 are devices used in optical fiber networks to add or remove (i.e., drop) optical signals from a communications pathway, and operate based on Time Division Multiplexing (TDM) to control when optical signals are allowed on a shared transmission medium. The DCCs 120 are an in-band communication channel part of every link between ADM-to-ADM and ADM-to-PE link in the network environment.

ADMs 110 are legacy devices, and users are generally upgrading away from using ADMs 110 and Synchronous Optical Networking and Synchronous Digital Hierarchy SONET/SDH networks towards using Multi-Protocol Label Switching (MPLS) networks. However, upgrading away from ADMs 110 is a multi-part process that involves each party in the communications chain. Accordingly, some parties can continue to use legacy ADMs 110 even when the other party is ready to upgrade away from ADMs 110.

Additionally, legacy ADMs 110 can handle the in-band management communication that does not use Transmission Control Protocol/Internet Protocol (TCP/IP) communications protocols or the seven-layer Open Systems Interconnection (OSI) model. Indeed, ADMs 110 routinely use standard layers in L1-L3, but proprietary layers in L4-L7 according to the OSI model, and different ADMS 110 may use different proprietary L4-L7 layers. To handle the various (open and proprietary) standards used by different ADMs 110, a Gateway Network Element (GNE) is provided to terminate in-band communication channels and exchange packet encapsulation with the DCC 120 to enable cross-media routing between the TDM-based networking for the ADMs 110 and an Internet Protocol (IP) based Digital Communication Network (DCN) 140.

Although generally discussed herein in relation to interfacing ADM-based networks with IP DCN-based networks over an MPSL network, the present disclosure is not so limited, and may be applied to interface any two networks using different L2 medias over a third network of any type. Accordingly, the ADMs 110 are non-limiting representations of network access controller for a first L2 media type that is otherwise incompatible for direct packet transmission with the second L2 media type represented by the IP DCN 140.

Rather than maintaining a second set of ADMs 110 and SONET/SDH networking elements until the other party is ready to switch over to MPLS networking, the second party can instead manage a set of DCCs 120 (located in a separate location from the ADMs 110) that are provided by various Provider Edge (PE) routers 180a-c (generally or collectively, PE routers 180; representative of various network devices) and virtual GNEs 130a-c (generally or collectively, virtual GNE 130) to route in-band management communications across the different communications media with lower hardware overhead and streamlined management from a Network Management System (NMS) 190.

Several virtual GNEs 130 may be provided on one GNE device 160 to serve as the ingress/egress point for cross-media communications between the IP DCN 140 and the ADMs 110. The virtual GNEs 130 can share a single Ethernet port 170 connection between a first PE router 180a and the GNE device 160. The Ethernet port 170 is addressable via several Virtual Local Area Network (VLAN) header fields 150a-e (generally or collectively, VLAN header fields 150), where each VLAN header field 150 is associated with one virtual GNE 130.

The virtual GNE 130 can be under the control of a different party than that ADMs 110 and the PE routers 180 and public network fibers, repeaters, transmitters and other intervening network elements that the packets are carried on between the PE routers 180. The purpose the virtual GNEs 130 is to provide Ethernet access to a set of network entities that only have DCC connections and to translate between the TCP/IP stack and the 7 layer OSI stack. In various embodiments, each virtual GNE 130 is associated with one user or controller for ADMs 110 via a corresponding VLAN header field 150, and individual virtual GNE 130 can be associated with one or more ADMs 110 accordingly. For example, the first virtual GNE 130a is associated with the first ADM 110a and the second ADM 110b, which are under the control of a first user, via the first VLAN header field 150a and the second VLAN header field 150b, respectively. Continuing the example, the second virtual GNE 130b is associated via the third VLAN header field 150c with the third ADM 110c, which is under the control of a different user than the first and second ADMs 110a-b.

The virtual GNEs 130 are linked to the associated ADMs 110 via network tunnels that are a 1:1 representation of the ADM-to-DCC connections. Accordingly, a NMS 190 can see the network environment as a set of GNE-to-ADM connections using SONET/SDH networking standards despite the additional intervening network elements and the other standards in place. The network tunnels allow for interworking at the CLNP layer to be performed, so that the DCCs 120 can be used facing the ADMs 110 and Ethernet/VLAN can be used facing the GNE device 160 and the IP DCN 140.

In various embodiments, the DCCs 120 are provided in separate facilities from one another, from the virtual GNEs 130, and combinations thereof. For example, the first PE router 180a can be provided in a first facility, while the second PE router 180b and the third PE router 180c are respectively provided in a second and a third facility that are remotely located from one another. The separate facilities (and thereby the PE routers 180) can be connected to one another via the IP/MPLS network used to carry data traffic. The DCC 120 are linked over the intervening network 195 between the PE routers 180 via CLNP networking tunnels that change the encapsulation of the various packets for transmission for easy handling across the different standards used in the legacy and current networking hardware.

Figure 2:
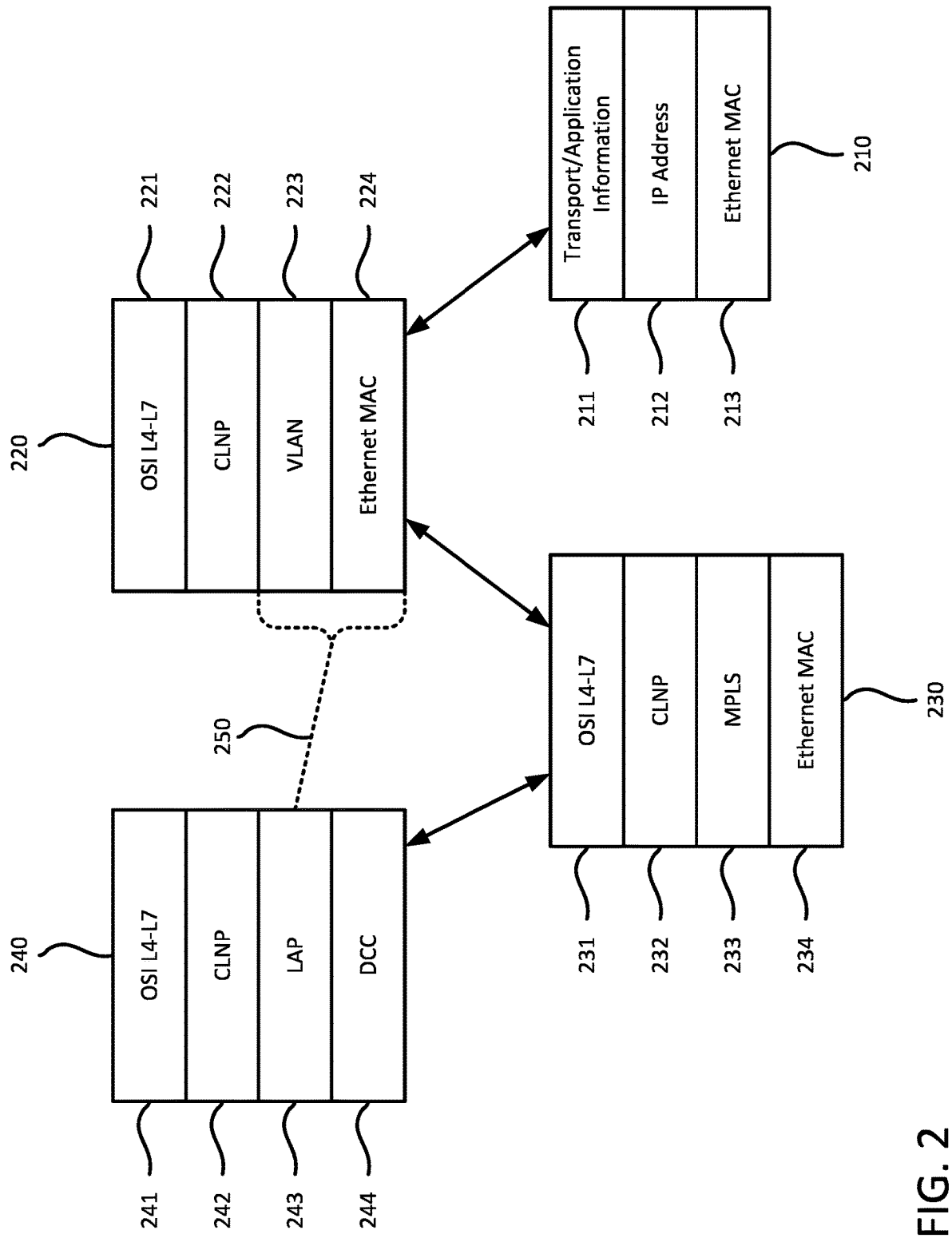
FIG. 2 illustrates packet encapsulation across a network connected to multiple L2-media networks, according to embodiments of the present disclosure.

FIG. 2 illustrates packet encapsulation across a network connected to multiple L2-media networks, according to embodiments of the present disclosure. The various schemes shown in FIG. 2 are implemented at different points in the network environment (as described in relation to FIG. 1) with packets destined for the ADMs 110 from the IP DCN 140 or packets destined for the IP DCN 140 from the ADMs 110. The packets are carried without any data link layer information across the network tunnels, which allows for easier translation from one data link type to a second data link type (e.g., Ethernet/VLAN to LAPD or vice versa) on either end of the network tunnel connection.

A first encapsulation scheme 210, as may be transmitted between GNE device 160 and the IP DCN 140, is formatted according to a an Ethernet/VLAN data link type. The first encapsulation scheme 210 includes transport and application information 211 (e.g., UDP/TCP), IP address 212 (to identify a sender/receiver in the DCN 140), and an Ethernet MAC address 213 (to identify the virtual GNE) as may be used in a modern IP DCN 140 for addressing and handling packets.

A second encapsulation scheme 220, as may be transmitted between GNE device 160 and the GNE-facing PE router 180, is formatted to link the IP based networking protocols with connectionless mode transmission over the network tunnel. The second encapsulation scheme 220 includes OSI L4-L7 information 221, CLNP information 222 (for handling the packet fragmentation and timing for TDM), a VLAN tag 223 (to identify the VLAN header field 150 that the network tunnel is addressed to/from), and an Ethernet MAC address 224, to route the packet between the associated network tunnel and IP address.

A third encapsulation scheme 230, as may be transmitted between the PE routers 180, is formatted to link the connectionless mode transmission over the network tunnel with the LAPD-based networking protocols. The third encapsulation scheme 230 includes OSI L4-L7 information 231, CLNP information 232 (for handling the packet fragmentation and timing for TDM), MPLS information 233 (for routing the packet in the MPLS network), and an Ethernet MAC address 234, to route the packet between the associated network tunnel and DCC 120.

A fourth encapsulation scheme 240, as may be transmitted between the ADMs 110 and the DCCs 120, is formatted according to an LAPD data type. The fourth encapsulation scheme 240 includes OSI L4-L7 information 241, CLNP information 242 (for routing the packet in the MPLS network), and LAP information 243 (for use by the ADM 110 for routing in a local network), and DCC information 244 (identifying the DCC 120 endcap to the network tunnel) as may be used in a SONET/SDH network for addressing and handling packets.

In various embodiments, the OSI L4-L7 information 211, 221, 231, 241, indicate the same data for a given packet, but may be formatted differently in each encapsulation scheme 210-240. Similarly, the CLNP information 222, 232, and 242 and the Ethernet MAC addresses 213, 224, and 234 indicate the same data for a given packet, but may be formatted differently in each encapsulation scheme 210-240. The substitutions for different data types in across different encapsulation schemes 210-240 are generally made according to a mapped arrangement to properly route the packet between the different L2 media via the network tunnels by adding needed routing data and removing extraneous routing data. For example, an address mapping 250 between the LAP information 243 in the fourth encapsulation scheme 240 and the VLAN tag 223 and Ethernet MAC address 224 in the second encapsulation scheme 220.

In various embodiments, the GNE device 160 and the PE routers 180 use a known address mapping 250 (either set manually or through learned exchanges) to exchange CLNP packets over VLAN tagged Ethernet interfaces which identify a unicast MAC address for use in the Ethernet MAC addresses 213, 224, and 234. However, in some embodiments, when the address mapping 250 is missing or otherwise unknown for a given network tunnel, the devices can substitute a broadcast MAC address for the (unknown) unicast MAC address in the Ethernet MAC addresses 213, 224, and 234, so that the information is sent between the GNE device 160 and the PE router 180a addressing all potential recipients, and is adjusted over the next hop to address the intended recipient. For example, when a virtual GNE 130 does not have a Network Service Access Point (NSAP) to Machine Access Control (MAC) mapping for routing a packet to a given DCC 120, the virtual GNE 130 can forward the packet by transmitting the packet with a broadcast MAC address to the given DCC 120 and routing the packet according to the VLAN header field 150.

In other embodiments, when the address mapping 250 is missing or otherwise unknown for a given network tunnel, the devices can substitute a multicast MAC address for the (unknown) unicast MAC address in the Ethernet MAC addresses 213, 224, and 234, so that the information received by recipients that are listening to the multicast MAC address. After an intended recipient of a first packet using a broadcast or multicast MAC address responds with a second packet, the PE routers 180 (or the NMS 190) can automatically create an address mapping 250 with the correct unicast MAC address for future use from the learned connection. For example, when a virtual GNE 130 does not have a NSAP-to-MAC mapping to route the packet to a given DCC 120, the virtual GNE 130 maps a network tunnel logical connection between the DCC 120 and the virtual GNE 130 (e.g., a virtual wire or network tunnel), and the virtual GNE 130 then forwards the packet according to the now-mapped network tunnel logical connection.

The different schemes 210-240, when applied across the network environment, serve to normalize the in-band information exchange between the ADM 110 and the GNE device 160 via a CLNP layer. The ADM-facing PE routers (e.g., the second and third PE routers 180b-c in FIG. 1) terminate both the physical DCC layer and the logical LAPD layer, and carry the CLNP packets across the MPLS network 195 (between the PE routers 180) using a network tunnel. The PE router 180 facing the GNE device 160 (e.g., the first PE router 180a in FIG. 1) takes the CLNP packets received via the network tunnel and encapsulates those packets into Ethernet frames. To separate CLNP packets of each DCC 120 in a logical manner, the packets are given a VLAN tag 223 for the associated virtual GNE 130. The GNE device 160 instantiates a GNE function to act as a virtual ADM to connect communications to the corresponding VLANs. From the GNE device 160, native TCP/IP communications over a modern IP DCN 140 can be linked with legacy communications over the ADMs 110.

Figure 3A:
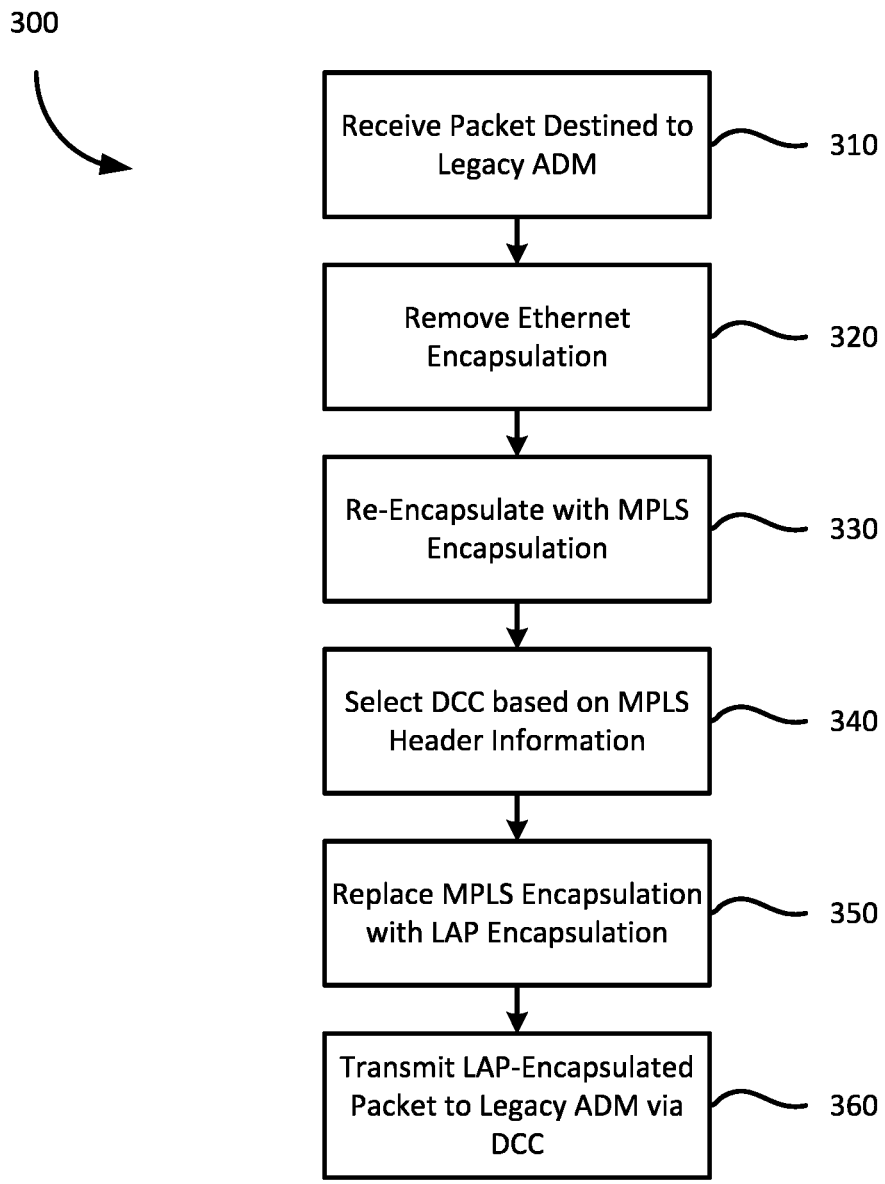
FIG. 3A is a flowchart of a method for communicating over an MPLS network from an IP DCN to an ADM, according to embodiments of the present disclosure.

FIG. 3A is a flowchart of a method 300 for communicating over an MPLS network 195 from an IP DCN 140 to an ADM 110, according to embodiments of the present disclosure. Method 300 begins with block 310, where a GNE device 160 receives a packet destined for a legacy ADM 110. The GNE device 160 may include one or more virtual GNEs 130 that are associated with different ADMs 110, and forward the packet to the corresponding virtual GNE 130 for formatting and transmission to the ADM 110.

At block 320 the virtual GNE 130 associated with the destination ADM 110 removes Ethernet encapsulation from the received packet. In various embodiments, the virtual GNE 130 changes the encapsulation scheme of the packet from the first encapsulation scheme 210 to the second encapsulation scheme 220 by removing the IP address 212 from the packet and substituting the VLAN tag 223 associated with the destination ADM 110 therefor and adding CLNP information 222 to the packet.

At block 330, the PE router 180 between the virtual GNE 130 and the network 195 receives the packet (according to the second encapsulation scheme 220) from the virtual GNE 130 to re-encapsulate the packet according to an MPLS encapsulation (e.g., the third encapsulation scheme 230). In various embodiments, the PE router 180 replaces the VLAN tag 223 put in at block 320 with MPLS information 233 to tunnel the packet to another PE router across the MPLS network 195, and retains the CLNP information 222.

At block 340, the PE router 180 selects a DCC 120 based on the MPLS header information and forwards the packet (formatted according to the third encapsulation scheme 230) to a DCC 120 associated with the legacy ADM 110. In various embodiments, the DCC 120 is hosted on another PE router 180 that is located in a separate facility from the GNE device 160 hosting the virtual GNE 130, and the packet is tunneled over the IP/MPLS network, such that the packet is tunneled between the virtual GNE 130 and the DCC 120 via a network tunnel carried over the IP/MPLS network 195 between the separate facilities.

At block 350, the receiving DCC 120 replaces the MPLS encapsulation added at block 330 with a Link Access Protocol (LAP) encapsulation. In various embodiments, the DCC 120 receives the packet formatted according to the third encapsulation scheme 230 and replaces the MPLS information 233 with LAP information 243 and the Ethernet MAC address 234 with the DCC information 244 (identifying the DCC 120), and retains the CLNP information 232.

Figure 3B:
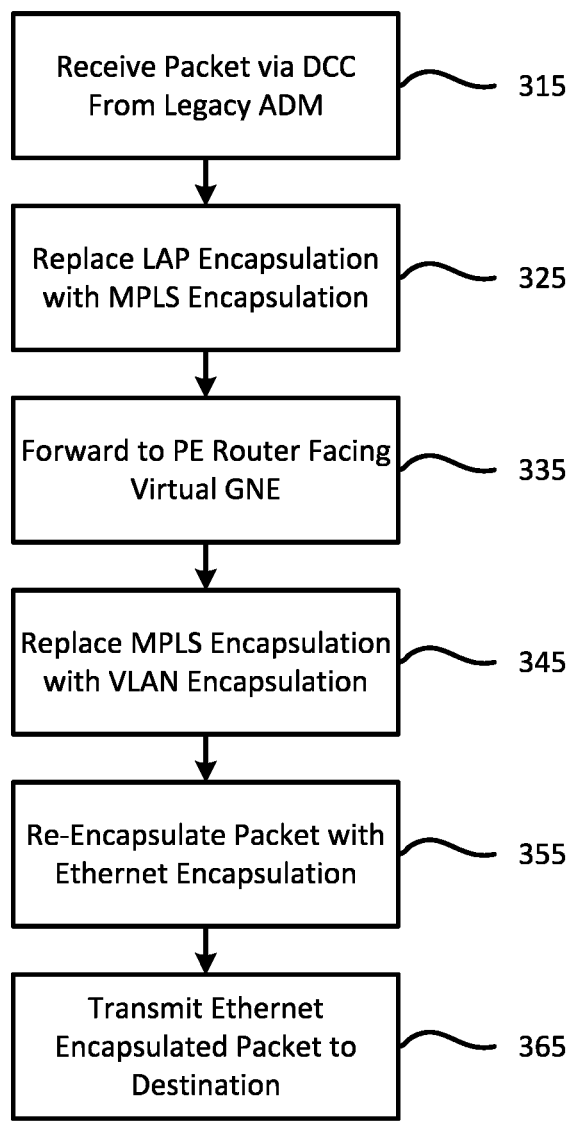
FIG. 3B is a flowchart of a method for communicating over an MPLS network from an ADM to an IP DCN, according to embodiments of the present disclosure.

At block 360, the DCC 120 transmits the packet, encapsulated with the LAP encapsulation (e.g., the fourth encapsulation scheme 240) to the associated legacy ADM 110 via the DCC 120. Once received by the legacy ADM 110, the legacy ADM 110 may forward to the original destination within the network node served by the ADM 110. In this manner, the IP DCN 140 is interfaced over the MPLS network 195 with a local network served by a legacy ADM 110 without having to install or maintain special hardware in the network, FIG. 3B is a flowchart of a method 305 for communicating over an MPLS network from an ADM 110 to an IP DCN 140, according to embodiments of the present disclosure. Method 305 begins with block 315, where a DCC 120 receives a packet from a legacy ADM 110 that is destined fora device hosted in the IP DCN 140. The DCC 120 may be hosted on a PE router 180 that includes one or more DCCs 120 associated with various corresponding ADMs 110.

At block 325, the DCC 120 replace LAP encapsulation from the received packet with MPLS encapsulation. In various embodiments, the DCC 120 changes the encapsulation scheme of the packet from the fourth encapsulation scheme 240 to the third encapsulation scheme 230 by removing the LAP information 243 and DCC information 244 and adding MPLS information 233.

At block 335, the DCC 120 forwards the packet (formatted according to the third encapsulation scheme 230) to a PE router 180 facing a virtual GNE 130 associated with the ADM 110. In various embodiments, the DCC 120 is hosted on another PE router 180 that is located in a separate facility form the virtual GNE 130, and the packet is tunneled over the IP/MPLS network, such that the packet is tunneled between the PE routers 180 associated with each of the DCC 120 and the virtual GNE 130 via a network tunnel carried over the IP/MPLS network between the separate facilities.

At block 345, the PE router 180 facing the virtual GNE 130 receives the packet (according to the third encapsulation scheme 220) from the PE router 180 hosting the DCC 120 and replaces the MPLS encapsulation with VLAN encapsulation for delivery to the virtual GNE 130 associated with the legacy ADM 110. In various embodiments, the PE router 180 replaces the MPLS information 233 with a VLAN tag 223 to address the packet to a given virtual GNE 130 hosted on a GNE device 160 with one or more other virtual GNEs 130, each associated with a given ADM 110 via a corresponding VLAN header field 150.

At block 355, the virtual GNE 130 re-encapsulates the packet with Ethernet encapsulation. In various embodiments, the virtual GNE 130 removes the CLNP information 222 and VLAN tag 223 from the packet and add an IP address 212 for the destination in the IP DCN 140 to the packet (e.g., converting from the second encapsulation scheme 220 to the first encapsulation scheme 210).

At block 365, the virtual GNE 130 transmits the packet encapsulated with the Ethernet encapsulation to a recipient in the IP DCN 140 identified in the packet. In this manner, the legacy ADM 110 is interfaced over the MPLS network 195 with an IP DCN 140 without having to install or maintain special hardware in the network or replace hardware at an end-user facility for the ADM 110.

Figure 4:
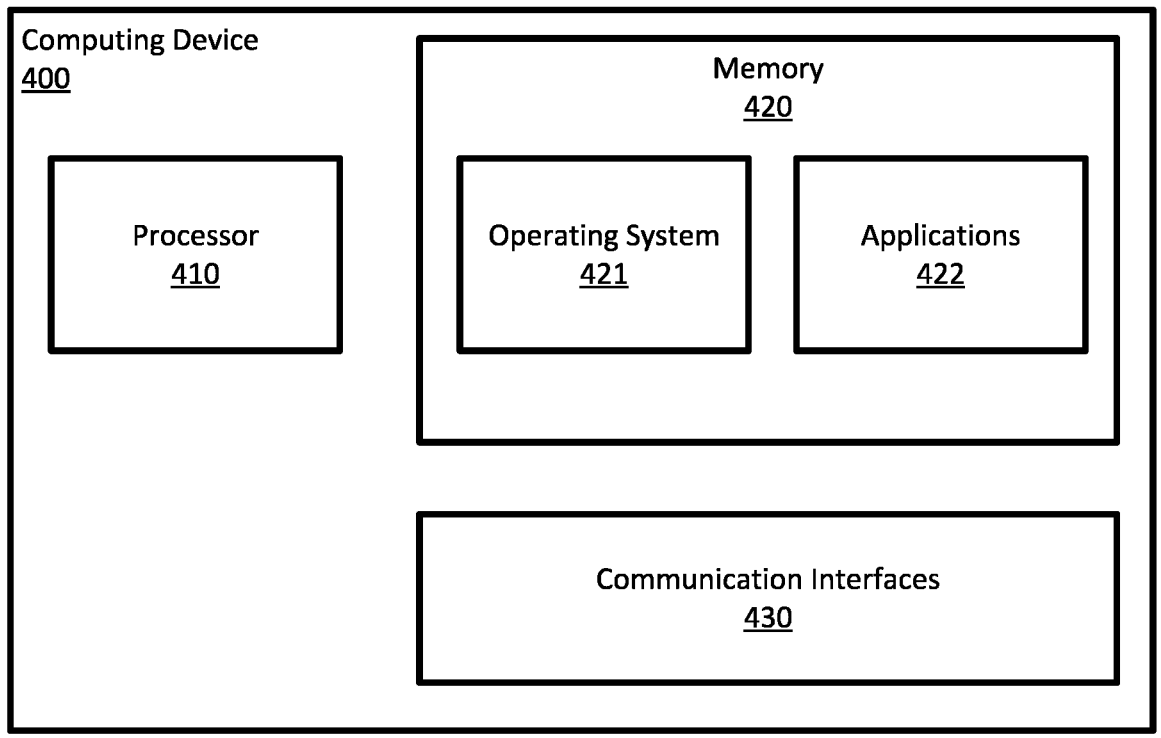
FIG. 4 illustrates hardware of a computing device, according to embodiments of the present disclosure.

FIG. 4 illustrates hardware of a computing device 400 such as can be included in an ADM 110, a GNE device 160, a PE router 180, or NMS 190 as described herein. The computing device 400 includes a processor 410, a memory 420, and communication interfaces 430. The processor 410 may be any processing element capable of performing the functions described herein. The processor 410 represents a single processor, multiple processors, a processor with multiple cores, and combinations thereof. The communication interfaces 430 facilitate communications between the computing device 400 and other devices. The communication interfaces 430 are representative of wireless communications antennas and various wired communication ports including out-pins and in-pins to a microcontroller. The memory 420 may be either volatile or non-volatile memory and may include RAM, flash, cache, disk drives, and other computer readable memory storage devices. Although shown as a single entity, the memory 420 may be divided into different memory storage elements such as RAM and one or more hard disk drives.

As shown, the memory 420 includes various instructions that are executable by the processor 410 to provide an operating system 421 to manage various functions of the computing device 400 and one or more applications 422 to provide various functionalities to users of the computing device 400, which include one or more of the functions and functionalities described in the present disclosure including receiving, handling (e.g., de-encapsulating and re-encapsulating), and transmitting packets to intended destinations in the network.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:
receiving, at a virtual gateway network element (GNE) on a cross-media device and under control of a first entity, a packet from a first level two (L2) media type network for transmission to a second L2 media type network under control of a second entity, wherein the first L2 media type network and the second L2 media type network are incompatible for direct packet transmission;
removing, at the virtual GNE, Ethernet encapsulation from the packet by replacing the Ethernet encapsulation with a Virtual Local Area Network (VLAN) tag and adding Connectionless-mode Network Protocol (CLNP) information to the packet;
re-encapsulating, at a first network device located between the virtual GNE and a packet network, the packet in a multi-protocol label switching (MPLS) encapsulation;
forwarding, over the packet network, the packet from the first network device to a digital communication channel (DCC) on a second network device, wherein the DCC is associated with the second L2 media type network, wherein the packet network is between the first network device and the second network device;
replacing, at the DCC on the second network device, the MPLS encapsulation with a Link Access Protocol (LAP) encapsulation; and
transmitting the packet encapsulated with the LAP encapsulation to the second L2 media type network.

2. The method of claim 1, wherein the DCC and the virtual GNE are located at separate facilities that are under the control of the first entity, which are linked via the packet network, wherein the packet is tunneled between the virtual GNE and the DCC via a network tunnel carried over the packet network between the separate facilities.

3. The method of claim 1, further comprising:
receiving a second packet at the DCC from the second L2 media type network;
removing, at the DCC, the LAP encapsulation from the second packet;
re-encapsulating, at the DCC, the second packet in the MPLS encapsulation;
forwarding the second packet from the DCC to the virtual GNE via the first network device;
replacing the MPLS encapsulation with the Ethernet encapsulation; and
transmitting the second packet encapsulated with the Ethernet encapsulation to a recipient identified in the second packet in the first L2 media type network.

4. The method of claim 1, further comprising, in response to determining that the virtual GNE does not have a Network Service Access Point (NSAP) to Machine Access Control (MAC) mapping for routing the packet to the DCC, forwarding the packet includes transmitting the packet with a broadcast MAC address to the DCC and routing the packet according to a VLAN header.

5. The method of claim 4, further comprising, in response to determining that the virtual GNE does not have a NSAP-to-MAC mapping for routing the packet to the DCC, mapping a network tunnel logical connection between the DCC and the virtual GNE, forwarding the packet includes transmitting the packet according to the network tunnel logical connection.

6. The method of claim 1, further comprising, in response to determining that the virtual GNE does not have a NSAP-to-MAC mapping for routing the packet to the DCC, forwarding the packet includes transmitting the packet with a multicast MAC address to the DCC and routing the packet to the DCC according to a VLAN header.

7. The method of claim 1, wherein the packet is tunneled between the virtual GNE and the DCC as a Connectionless-mode Network Protocol (CLNP) packet without data link layer information.

8. A method, comprising:
receiving, at a digital communication channel (DCC) on a first network device and under control of a first entity, a packet from a first level two (L2) media type network under the control of a second entity destined for a recipient in a second L2 media type network, wherein the first L2 media type network and the second L2 media type network are incompatible for direct packet transmission;
removing, at the DCC, a Link Access Protocol (LAP) encapsulation from the packet;
re-encapsulating, at the DCC, the packet in a multi-protocol label switching (MPLS) encapsulation;
forwarding the packet from the DCC to a second network device via a packet network, wherein the second network device is between a virtual Gateway Network Element (GNE) on a cross-media device, wherein the virtual GNE is associated with the first L2 media type network and the packet network, wherein the packet network is between the first network device and the second network device;
replacing the MPLS encapsulation with an Ethernet encapsulation by:
replacing the MPLS encapsulation with a Virtual Local Area Network (VLAN) tag;
adding Connectionless-mode Network Protocol (CLNP) information to the packet; and
re-encapsulating the packet with the Ethernet encapsulation; and
transmitting, from the virtual GNE, the packet encapsulated with the Ethernet encapsulation to the recipient identified in the packet in the second L2 media type network.

9. The method of claim 8, wherein the DCC and the virtual GNE are located at separate facilities that are under the control of the second entity, which are linked via the packet network, wherein the packet is tunneled between the DCC and the virtual GNE via a network tunnel carried over the packet network between the separate facilities.

10. The method of claim 8, further comprising:
receiving, at the virtual GNE, a second packet for transmission to the first L2 media type network from the second L2 media type network;
removing, at the virtual GNE, the Ethernet encapsulation from the second packet;
re-encapsulating, at the first network device, the second packet in the MPLS encapsulation;
forwarding the packet from the first network device to the DCC associated with the first L2 media type network;
replacing, at the DCC, the MPLS encapsulation with the LAP encapsulation; and
transmitting the packet encapsulated with the LAP encapsulation to the first L2 media type network.

11. The method of claim 10, further comprising, in response to determining that the virtual GNE does not have a Network Service Access Point (NSAP) to Machine Access Control (MAC) mapping for routing the packet to the DCC, forwarding the packet includes transmitting the packet with a broadcast MAC address to the DCC in communication with the virtual GNE according to a VLAN header.

12. The method of claim 10, further comprising, in response to determining that the virtual GNE does not have a NSAP-to-MAC mapping for routing the packet to the DCC, mapping a network tunnel logical connection between the DCC and the virtual GNE, and forwarding the packet includes transmitting the packet according to the network tunnel logical connection.

13. The method of claim 10, further comprising, in response to determining that the virtual GNE does not have a NSAP-to-MAC mapping for routing the packet to the DCC, forwarding the packet includes transmitting the packet with a multicast MAC address to the DCC and routing the packet to the DCC according to a VLAN header.

14. The method of claim 8, wherein the packet is tunneled between the DCC and the virtual GNE as a Connectionless-mode Network Protocol (CLNP) packet without data link layer information.

15. A system, comprising:
a virtual Gateway Network Element (GNE) on a cross-media device and connected to a first level two (L2) media type network via an Ethernet connection and to a first router controlled by a first party; and
a digital communication channel (DCC) hosted on a second router connected over an internet protocol (IP) network to the first router, and associated with a second L2 media type network controlled by a second party wherein the first L2 media type network and the second L2 media type network are incompatible for direct packet transmission;
wherein the virtual GNE and the first router are configured to:
receive, at the virtual GNE, downlink packets from the first party for transmission to the second party;
remove, at the virtual GNE, Ethernet encapsulation from the downlink packets by replacing the Ethernet encapsulation with a Virtual Local Area Network (VLAN) tag and adding Connectionless-mode Network Protocol (CLNP) information to the downlink packets;
re-encapsulate, at the first router, the downlink packets in a multi-protocol label switching (MPLS) encapsulation;
forward the downlink packets with the MPLS encapsulation to the DCC over a packet network between the first router and the second router;
receive uplink packets with the MPLS encapsulation from the DCC via the packet network, wherein the uplink packets are received by the DCC from the second party for transmission to the first party;
replace, at the virtual GNE, the MPLS encapsulation in the uplink packets with the Ethernet encapsulation; and
transmit, from the virtual GNE, the uplink packets encapsulated with the Ethernet encapsulation to the first party.

16. The system of claim 15, wherein the DCC and second router are configured to:
receive the forwarded downlink packets from the virtual GNE;
replace the MPLS encapsulation in the forwarded downlink packets with a Link Access Protocol (LAP) encapsulation;
transmit the downlink packets encapsulated with the LAP encapsulation to the second L2 media type network;
receive the uplink packets from the second L2 media type network;
remove the Link Access Protocol (LAP) encapsulation from the uplink packets received from the second L2 media type network;
re-encapsulating, with the MPLS encapsulation, the uplink packets from which LAP encapsulation was removed; and
forward the uplink packets encapsulated with the MPLS encapsulation to the virtual GNE.

17. The system of claim 15, wherein the first router is further configured to forward the downlink packets with the MPLS encapsulation to the DCC via a Media Access Control (MAC) broadcast address and a VLAN header in response to the virtual GNE not having a Network Service Access Point (NSAP) to MAC mapping for routing the downlink packets to the DCC.

18. The system of claim 15, wherein the virtual GNE is further configured to forward the downlink packets with the MPLS encapsulation to the DCC via a Media Access Control (MAC) broadcast address and a VLAN header in response to the virtual GNE not having a Network Service Access Point (NSAP) to MAC mapping for routing the downlink packets to the DCC.

19. The system of claim 15, wherein the uplink packets and the downlink packets are tunneled between the DCC and the virtual GNE via a network tunnel carried over the IP network.

20. The system of claim 15, wherein the uplink packets and the downlink packets are tunneled between the DCC and the virtual GNE as a Connectionless-mode Network Protocol (CLNP) packets without data link layer information.

* * * * *